United States Patent Office 3,196,911
Patented July 27, 1965

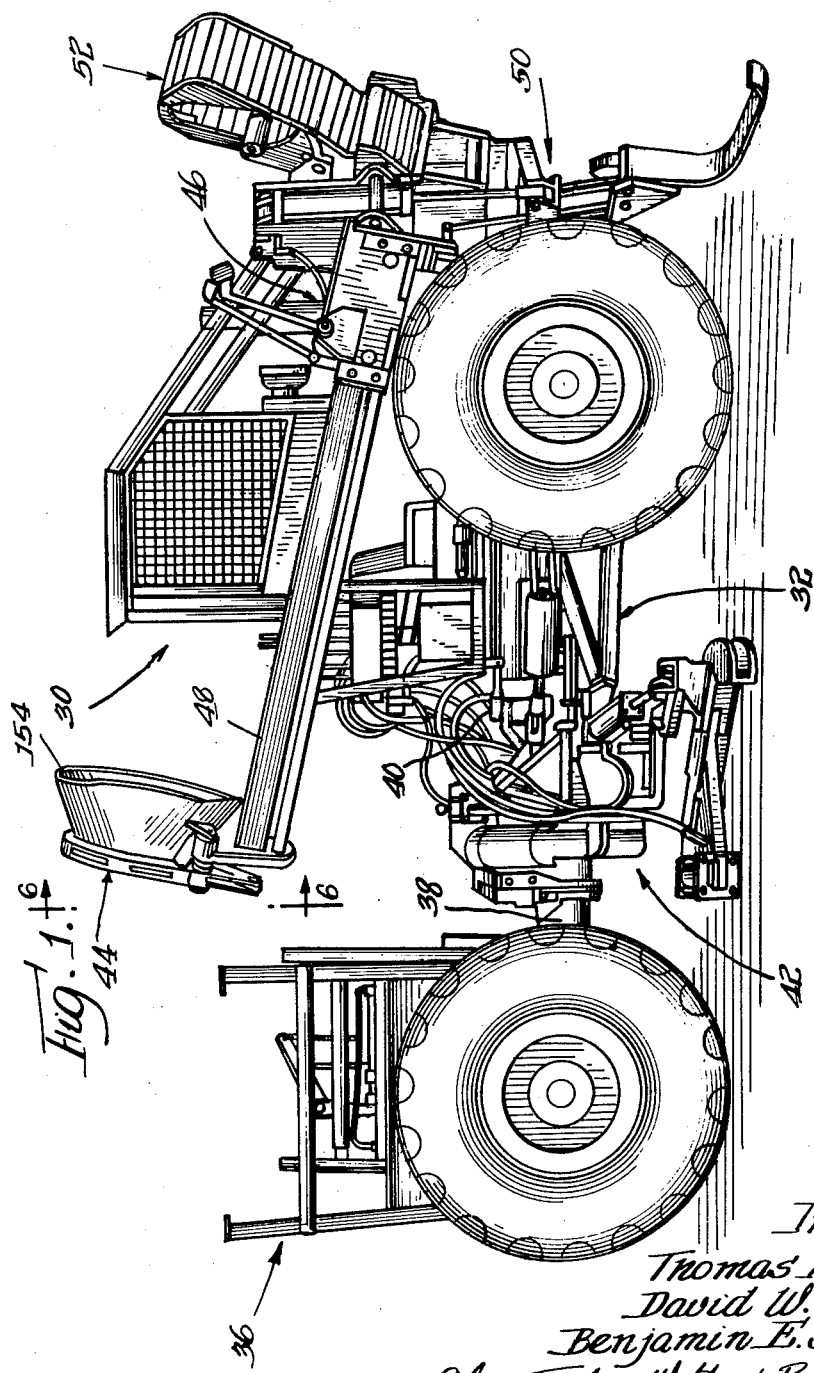

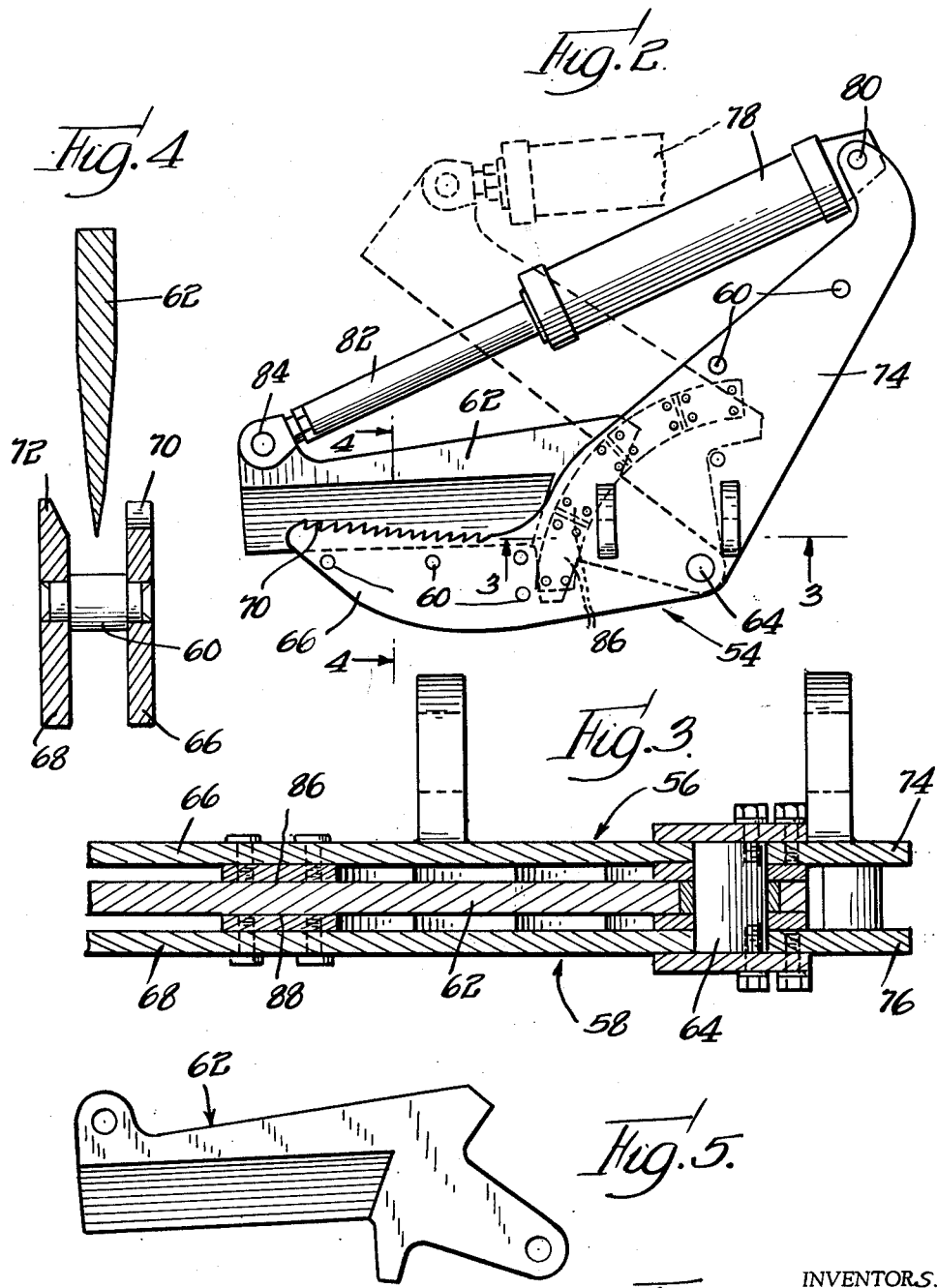

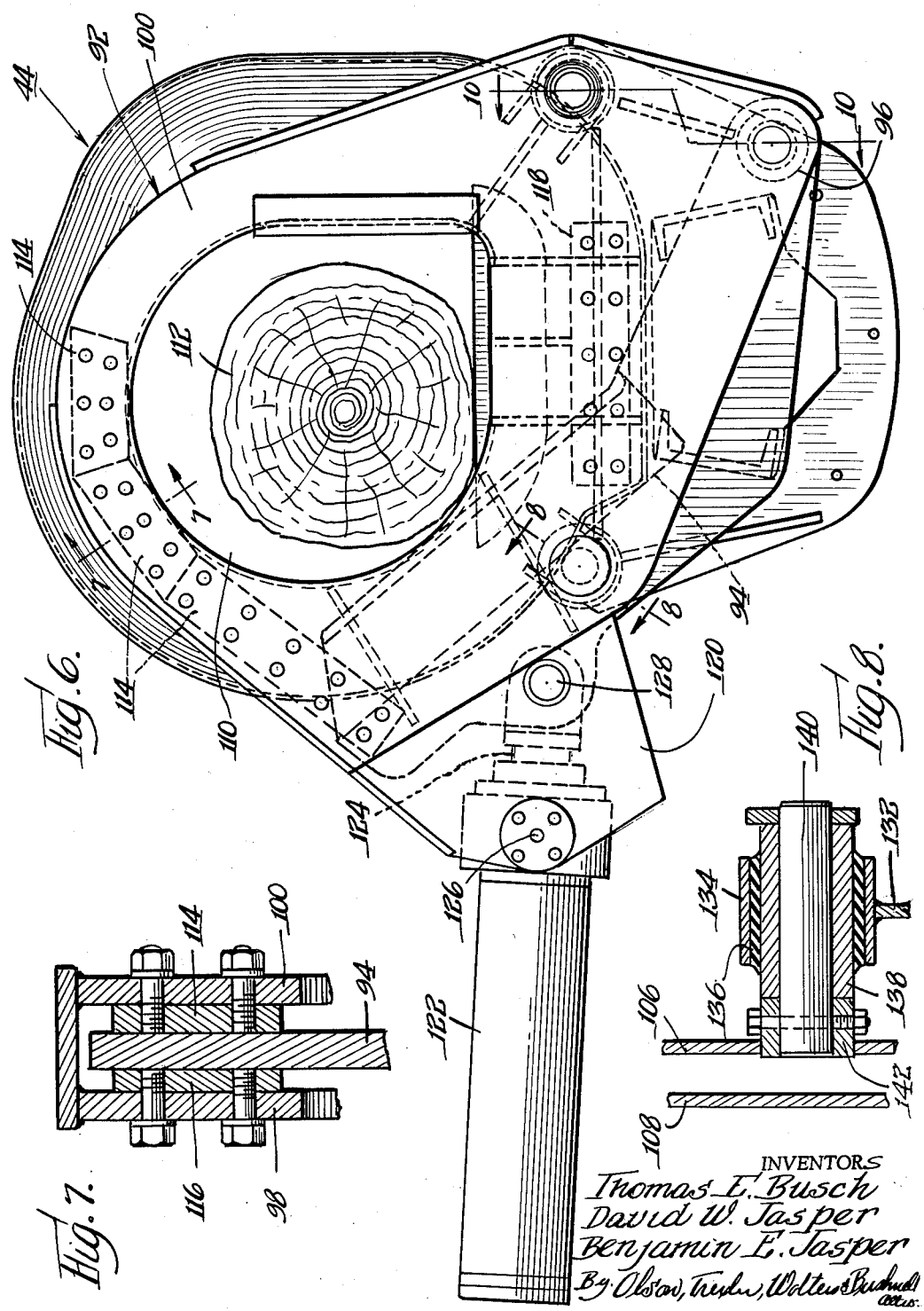

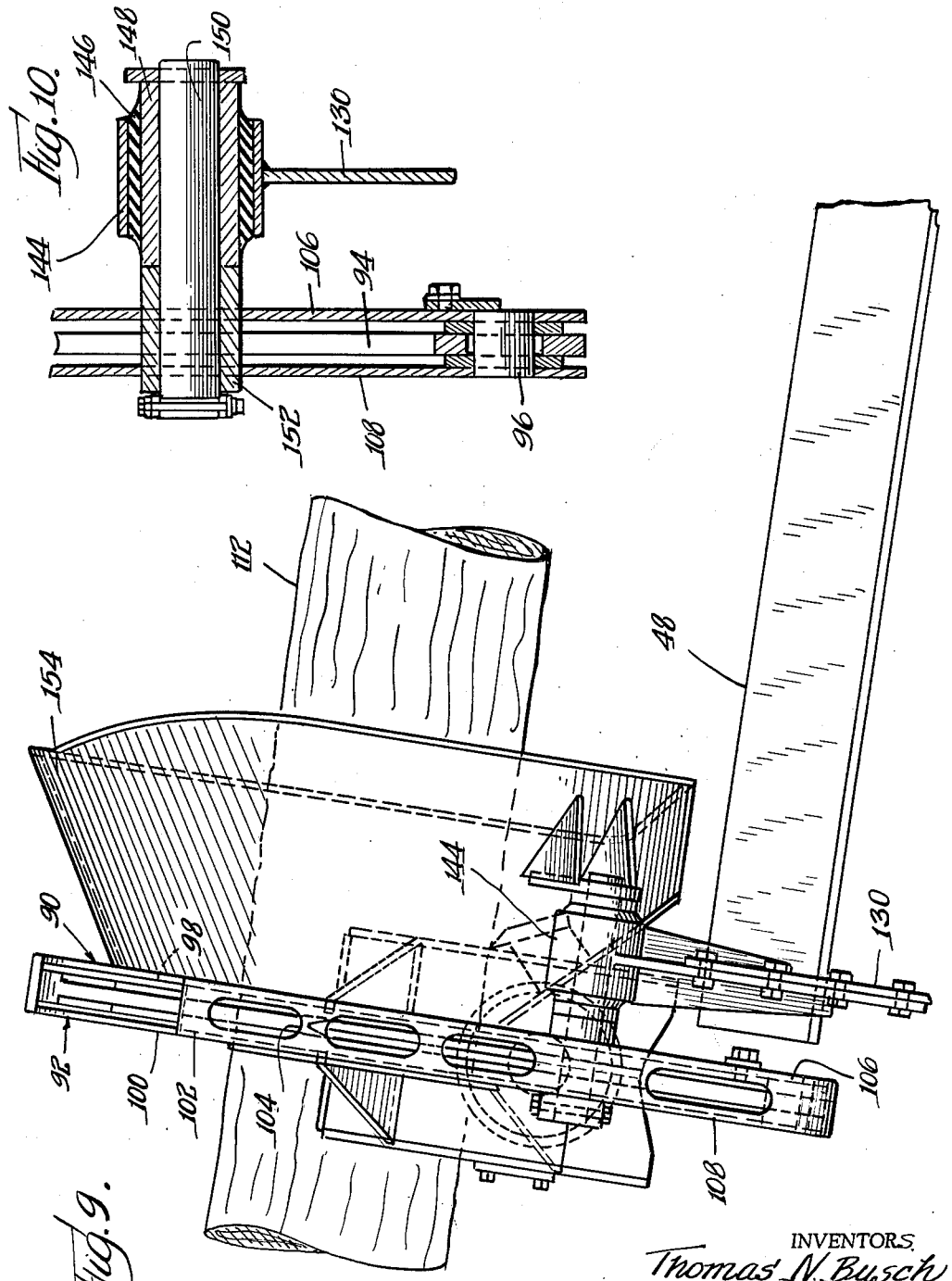

3,196,911
SHEARING HEAD
Thomas N. Busch, Daphne, Ala., and David W. Jasper, Chicago, and Benjamin E. Jasper, Kankakee, Ill., assignors to Timberline Equipment Company, Bradley, Ill., a corporation of Illinois
Filed Aug. 6, 1962, Ser. No. 215,056
2 Claims. (Cl. 144—34)

This application is a continuation-in-part of our copending application Serial No. 5,919, filed February 1, 1960, issued October 23, 1962 as Patent No. 3,059,677.

The present invention relates to a novel apparatus for processing trees, and more specifically to a novel apparatus for felling and sectionalizing or bucking trees.

In the aforementioned copending application, there is disclosed an apparatus which is capable of being driven to a desired location adjacent a standing tree and of thereafter felling the tree, removing branches from the tree, bucking the tree and collecting tree sections together in a stack. The present application is particularly concerned with portions of the apparatus adapted to sever a tree for felling or bucking.

An important object of the present invention is to provide a novel apparatus of the above described type having improved cutting means for efficiently and easily severing a tree.

A more specific object of the present invention is to provide a novel tree shearing structure which is constructed so as to minimize any possibility of jamming as a result of wood chips and the like.

A further object of the present invention is to provide a novel shearing means which is of relatively simple, economical and rugged construction.

Other objects and advantages of the present invention will become apparent from the following description and the accompanying drawings wherein:

FIG. 1 is a side elevational view showing an apparatus incorporating features of the present invention;

FIG. 2 is a plan view showing the shearing head used for felling a tree and included in the apparatus of FIG. 1;

FIG. 3 is a fragmentary sectional view taken along line 3—3 in FIG. 2;

FIG. 4 is a fragmentary sectional view taken along line 4—4 in FIG. 2;

FIG. 5 is a plan view of the blade element incorporated in the shearing head of FIG. 2;

FIG. 6 is an enlarged end elevational view of a shearing head incorporated in the apparatus of FIG. 1 for bucking a felled tree as seen from line 6—6 in FIG. 1;

FIG. 7 is an enlarged fragmentary sectional view taken along line 7—7 in FIG. 6;

FIG. 8 is an enlarged fragmentary sectional view taken along line 8—8 in FIG. 6;

FIG. 9 is a side elevational view of the portion of the apparatus shown in FIG. 6; and FIG. 10 is an enlarged fragmentary sectional view taken generally along line 10—10 in FIG. 6.

Referring now more specifically to the drawings wherein like parts are designated by the same numerals throughout the various figures, a tree harvesting apparatus 30 incorporating features of the present invention is shown in FIG. 1. The apparatus comprises a self-propelled vehicle 32 having a forward tractor portion 34 and a trailer or cart unit 36 which includes a hollow tubular frame member 38 pivotally connected to the tractor at 40. The tractor unit is provided with its own power plant or engine, and the vehicle preferably includes four wheel drive means. The vehicle is also provided with self-contained hydraulic control means for actuating the various mechanisms mounted on the vehicle and also for controlling the vehicle.

A cutting or shearing mechanism 42 constructed in accordance with features of the present invention described more in detail below is mounted on the vehicle. The mechanism 42 is arranged so that it is adapted for cutting and felling standing trees and directing the fall of the trees forwardly along the side of the vehicle. The apparatus further includes another cutting or shearing unit 44 mounted above the vehicle and adapted to sever successive sections from a tree. As shown in FIG. 1, the severing or bucking shearing head 44 is positioned so that the severed tree sections will fall directly onto the trailer or cart unit 36.

In order to feed a felled tree to the bucking unit 44, the apparatus is provided with a reciprocable feeding carriage or gripping head mechanism 46 movable along a track structure 48. In addition a unit 50 is mounted adjacent the forward end of the vehicle for lifting a felled tree up to the carriage. Another unit 52 is mounted adjacent the forward end of the vehicle, which unit comprises a flexible blade structure adapted to be wrapped around a tree which has been placed on the feeding carriage 46 for removing branches from the tree during feeding movements of the tree toward the bucking or shearing head 44. The feeding, lifting and delimbing mechanisms are fully disclosed in the aforementioned copending application, and since these mechanisms do not form a part of the invention claimed in the present application, they need not be further described in detail herein.

As shown in FIGS. 1–5, the tree shearing and felling unit 42 comprises a shearing head 54 having upper and lower plate members 56 and 58. The plate members are secured together and are maintained in spaced apart parallel relationship by a plurality of securing and spacing means 60 (see FIG. 4). A cutting blade 62 is pivotally mounted by pin 64 to intermediate portions of the plate members 56 and 58. As shown in FIGS. 2 and 4, forward end portions 66 and 68 of the plate members provide one jaw of the cutting head disposed in opposing and co-operative relationship with respect to the blade member 62.

It is to be noted that the jaw portions 66 and 68 are spaced apart so that the blade member 62 may pass therebetween during a severing operation for ensuring complete separation of the tree. It is further important to note that the space between the jaw portions 66 and 68 is substantially unobstructed except for the securing and spacing means 60. With this construction any chips or splinters which may be created during a tree severing operation will be pushed outwardly through the space between the blade portions 66 and 68 and discharged from the outer edge of the head structure whereby jamming and packing of such chips or splinters are eliminated and possible interference with the shearing blade is prevented.

An inwardly facing margin of the jaw portion 66 is provided with inwardly directed teeth 70 for engaging a tree and preventing it from being squeezed or cammed outwardly from between the jaw members and the blade during a cutting operation. In addition an edge 72 of the jaw portions 68 is sharpened for biting into the tree and aiding in the cutting operation and also preventing the cutting head from slipping axially along the tree during the cutting operation.

The plate members 56 and 58 include tail portions 74 and 76 extending rearwardly and angularly from the jaw portions 66 and 68 as shown best in FIG. 2. In order to actuate the cutting blade, a double acting hydraulic cylinder 78 is pivotally connected by a pin 80 with ends of the tail portions 74 and 76, which cylinder has a reciprocable piston therein secured to a piston rod 82. The piston rod 82 extends outwardly from the cylinder and has its outer end connected by a pin 84 with an outer end portion of the blade member 62. Arcuately arranged bearing blocks 86 and 88 are disposed along and secured against the inner surfaces of the plate members 56 and 58 respectively as shown in FIG. 2 and 3 for engaging and guiding the blade member.

When it is desirable to fell a standing tree, the vehicle is driven to a point adjacent the tree. Then the mechanism 42 is actuated in a manner which need not be described in detail herein so that the shearing head 54 is positioned with its jaw portions and blade member embracing the tree. Then the cylinder 78 is actuated for pivoting the blade member from the broken line position shown in FIG. 2 toward the solid line position. The blade member is wedge shaped and the shearing head is constructed and arranged so that when the blade member reaches the substantially fully closed position shown in solid lines in FIG. 2, it extends substantially perpendicularly to the longitudinal axis of the vehicle. As a result the wedging action of the blade guides the severed tree and causes it to fall forwardly along the side of the vehicle and substantially parallel to the longitudinal axis of the vehicle.

As previously indicated, after a tree has been felled, the various mechanisms on the vehicle are actuated for lifting the tree and intermittently feeding successive sections of the tree to the shearing unit 44. As shown best in FIGS. 6–10, the shearing unit 44 also comprises a pair of spaced apart plate members 90 and 92 which are secured together so that the space therebetween is substantially unobstructed. A blade member 94 is pivotally connected by pin 96 to intermediate portions of the plate members 90 and 92. The plate members include jaw portions 98 and 100 oppositely disposed from the blade member 94 for cooperating with the blade member during a tree severing operation when the blade member is moved from the open position shown in FIG. 6 toward the jaw portions. As shown in FIG. 9, outer margins of the jaw portions 98 and 100 are welded or otherwise secured to a peripherally disposed connecting and spacing plate 102 having openings 104 of substantial size therethrough for permitting wood chips, splinters and the like to be forced outwardly from between the jaw portions of the plate members.

The plate members 90 and 92 also include portions 106 and 108 which correspond to the tail portions of the plate members 56 and 58 described above. However, as distinguished from the previously described shearing head, the jaw portions 98 and 100 and the additional portions 106 and 108 are extended and integrally joined in a manner such that they completely encircle a central opening 110 through which a tree 112 to be severed is advanced by the feeding means of the appartus. This arrangement materially enhances the strength and rigidity of the jaw portions.

In order to promote smooth operation of the blade member 94 and minimize any possibility of jamming or binding, means are provided for guiding the blade member along opposite sides of the opening 110 and a tree being severed. More specifically, bearing blocks 114 and 116 are respectively secured against inner surfaces of the plate members and around the arcuate and integrally joined outer ends of the portions 98–100 and 106–108. Similar bearing blocks 118 are secured against the inner surfaces of both of the plate members 90 and 92 along a side of the central opening 110 opposite from the outer bearing blocks 114 and 116 as shown in FIG. 6.

A bracket or housing structure 120 is secured to and projects laterally from the portions 106 and 108 of the plate members 90 and 92, which bracket structure is adapted to support a double acting hydraulic cylinder 122. A suitable piston is reciprocably disposed within the cylinder 122 and is secured to a rod 124. In this shearing head, the rod end of the cylinder 122 is connected by pivot pin means 126 with the bracket structure 120. The outer end of the piston rod 124 is pivotally connected as at 128 with an intermediate portion of the blade member so as to avoid interference with the bearing blocks.

The shearing head 44 is supported by brackets 130 and 132 (see FIGS. 8–10) which are respectively secured to the track structure 48 of the feeding means. As shown in FIG. 8, a sleeve 134 is welded on the bracket 132 and supports a bushing comprising a resilient member 136 formed of rubber or the like and a metal tube 138 within and supporting the rubber member. A rod 140 is mounted within and extends from the bushing and is detachably secured within a socket 142 welded or otherwise fixed to the portion 106 of the plate member 90. A sleeve 144 is also secured to the bracket 130 and supports a bushing having a resilient or rubber member 146 and a metal tubular liner 148. A rod 150 similar to the rod 140 extends from the tubular liner member 148 and projects into a socket member 152 which is welded or otherwise secured to and extends through both of the plate members 90 and 92. It will be appreciated that with this structure, the shearing head 44 is securely yet resiliently supported for minimizing any possibility of injury thereto as a result of shock loads, particularly during feeding of the tree through the shearing head. In order further to minimize any possibility of injury to the shearing head 44 and to promote proper feeding of the tree, a generally funnel shaped guide member 154 is welded or otherwise secured to the plate member 90 and bracket elements interconnected with the brackets 130 and 132. The funnel member 154 is shaped for assuring alignment of the tree 112 with the central opening 110 during feeding movement of the tree.

While the preferred embodiment of the present invention has been shown and described herein, it is obvious that many structural details may be changed without departing from the spirit and scope of the appended claims.

The invention is claimed as follows:

1. In a tree harvesting apparatus including a vehicle, a shearing head supported on said vehicle comprising,
   a first jaw provided by a pair of plates,
   bearing block means supported at an intermediate position on each of the confronting surfaces of said plates.
   a second jaw pivoted to said first jaw on one side of said bearing block means and movable between and supported by said bearing block means,
   a cutting blade on said second jaw on the other side of said bearing block means and pivotable between a position removed from and a position between said plates on the other side of said bearing block means,
   a plurality of spacers positioned between said plates on said other side of said bearing block means and spaced from each other and from the edge of said plates confronting said cutting blade and providing unobstructed passageways between said plates to permit scrap material from a cut to pass between said plates,
   and fluid operated cylinder and piston means extending between and pivotally connected to said first jaw and to said cutting blade portion of said second jaw for actuating said jaws.

2. In a tree harvesting apparatus including a vehicle, a shearing head supported on said vehicle comprising,
   a first jaw provided by a pair of plates,
   bearing block means supported at an intermediate position on each of the confronting surfaces of said plates,
   a second jaw pivoted to said first jaw on one side of said bearing block means and movable between and supported by said bearing block means,
   a cutting blade on said second jaw on the other side of said bearing block means and pivotable between a position removed from and a position between said plates on the other side of said bearing block means, a plurality of spacers positioned between said plates on said other side of said bearing block means and spaced from each other and from the edge of said plates confronting said cutting blade and providing unobstructed passageways between said plates to permit scrap material from a cut to pass between said plates, the edge of one of said plates confronting said cutting blade having teeth extending perpendicular to said plates to prevent lateral movement of the blades relative to a tree being cut, the edge of the other plate confronting said cutting blade having a sharpened cutting edge extending parallel to said plates to prevent said plates from moving longitudinally relative to a tree being cut, and fluid operated cylinder and piston means extending between and pivotally connected to said first jaw and to said cutting blade portion of said second jaw for actuating said jaws.

References Cited by the Examiner

UNITED STATES PATENTS

| | | |
|---|---|---|
| 392,662 | 11/88 | Carnahan _____ 83—694 XR |
| 1,915,435 | 6/33 | Miller. |
| 2,218,213 | 10/40 | Newman _____ 30—245 XR |
| 2,332,561 | 10/43 | Drott. |
| 2,543,109 | 2/51 | Holowka. |
| 2,565,252 | 8/51 | McFaull. |
| 2,652,077 | 9/53 | Alexander _____ 144—176 |
| 2,659,142 | 11/53 | Fender _____ 30—245 |
| 2,845,101 | 7/58 | Hoadley _____ 144—34.5 |
| 3,059,677 | 10/62 | Busch et al. _____ 144—309 |

FOREIGN PATENTS

| | | |
|---|---|---|
| 908,790 | 4/54 | Germany. |

LESTER M. SWINGLE, *Primary Examiner.*

EARL EMSHWILLER, WILLIAM W. DYER, Jr.,
*Examiners.*